United States Patent
diGirolamo et al.

(10) Patent No.: US 7,104,024 B1
(45) Date of Patent: Sep. 12, 2006

(54) CONNECTOR FOR CONNECTING TWO BUILDING MEMBERS TOGETHER THAT PERMITS RELATIVE MOVEMENT BETWEEN THE BUILDING MEMBERS

(75) Inventors: Edward R. diGirolamo, Raleigh, NC (US); Michael Torres, Raleigh, NC (US); Gary Bennett, Macon, NC (US); Michael Booth, Raleigh, NC (US)

(73) Assignee: The Steel Network, Inc., Raleigh, NC (US)

( * ) Notice: Subject to any disclaimer, the term of this patent is extended or adjusted under 35 U.S.C. 154(b) by 255 days.

(21) Appl. No.: 10/689,498

(22) Filed: Oct. 20, 2003

(51) Int. Cl.
  *E04C 2/40* (2006.01)
  *E04C 2/34* (2006.01)
(52) U.S. Cl. ............... 52/710; 52/712; 52/713; 52/696; 52/656.9; 52/703; 52/702; 403/403; 403/231
(58) Field of Classification Search ............ 403/403, 403/231, 2, 233, 234; 52/703, 712, 702, 52/696, 710, 167.1, 656.9, 713
See application file for complete search history.

(56) References Cited

U.S. PATENT DOCUMENTS

| | | | |
|---|---|---|---|
| 1,400,007 A | 12/1921 | Sparks | |
| 1,691,784 A | 11/1928 | Pietzsch | |
| 1,729,935 A | 10/1929 | Froehlich | |
| 2,065,529 A * | 12/1936 | Kehr et al. ................ | 52/774 |
| 2,365,478 A | 12/1944 | La Grotta | |
| 3,003,600 A | 10/1961 | MacKenzie | |
| 3,490,797 A * | 1/1970 | Platte ..................... | 52/282.1 |
| 3,715,850 A | 2/1973 | Chambers | |
| 4,148,454 A * | 4/1979 | Carlson et al. ........ | 248/222.11 |
| 4,251,969 A | 2/1981 | Bains | |
| 4,261,593 A | 4/1981 | Yeager | |
| 4,363,459 A | 12/1982 | Holzer | |
| 4,665,672 A * | 5/1987 | Commins et al. ............ | 52/295 |
| 4,796,403 A | 1/1989 | Fulton et al. | |
| 4,949,929 A | 8/1990 | Kesselman et al. | |
| 4,973,102 A | 11/1990 | Bien | |
| 5,009,557 A | 4/1991 | Dessirier | |
| 5,027,494 A | 7/1991 | Martin | |
| 5,467,570 A * | 11/1995 | Leek ........................ | 52/712 |
| 5,529,273 A | 6/1996 | Benthin | |
| 5,572,844 A * | 11/1996 | Stackenwalt et al. ..... | 52/506.07 |
| 5,577,860 A * | 11/1996 | Plank ........................ | 403/403 |
| 5,664,392 A | 9/1997 | Mucha | |
| 5,671,580 A | 9/1997 | Chou | |
| 5,720,571 A * | 2/1998 | Frobosilo et al. ........... | 403/403 |

(Continued)

*Primary Examiner*—Lanna Mai
*Assistant Examiner*—Phi Dieu Tran A
(74) *Attorney, Agent, or Firm*—Coats & Bennett

(57) ABSTRACT

A connector for interconnecting two building members together. The connector, in one embodiment, includes first and second plates secured together. Each plate includes one or more elongated slots wherein the elongated slots of one plate are oriented at an angle of approximately 90° with respect to the slots formed in the other plate. Fasteners extend through the slots in the plates and connect the plates of the connector to two building members such as a horizontal building member and a vertical building member. Once connected, one of the building members is free to move with respect to the other building member while the connector is connected to the two building members. In another embodiment, the connector is slidable within a track. In this embodiment, a portion of the connector extends from the track and connects to one of the building members while the track connects to the other one of the building members.

3 Claims, 11 Drawing Sheets

U.S. PATENT DOCUMENTS

| | | | |
|---|---|---|---|
| 5,794,395 A * | 8/1998 | Reed ........................... 52/298 |
| 5,846,018 A | 12/1998 | Frosbosito et al. |
| 5,906,080 A | 5/1999 | diGirolamo et al. |
| 6,058,668 A | 5/2000 | Herren |
| 6,199,929 B1 | 3/2001 | Hansch |
| 6,213,679 B1 | 4/2001 | Frobosilo et al. |
| 6,250,041 B1 * | 6/2001 | Seccombe ................... 52/712 |
| 6,494,639 B1 * | 12/2002 | Friend ........................ 403/403 |
| 6,612,087 B1 | 9/2003 | diGirolamo et al. |
| 6,719,481 B1 * | 4/2004 | Hoffmann ................... 403/403 |
| 6,941,712 B1 * | 9/2005 | Sukup et al. ............... 52/293.3 |

* cited by examiner

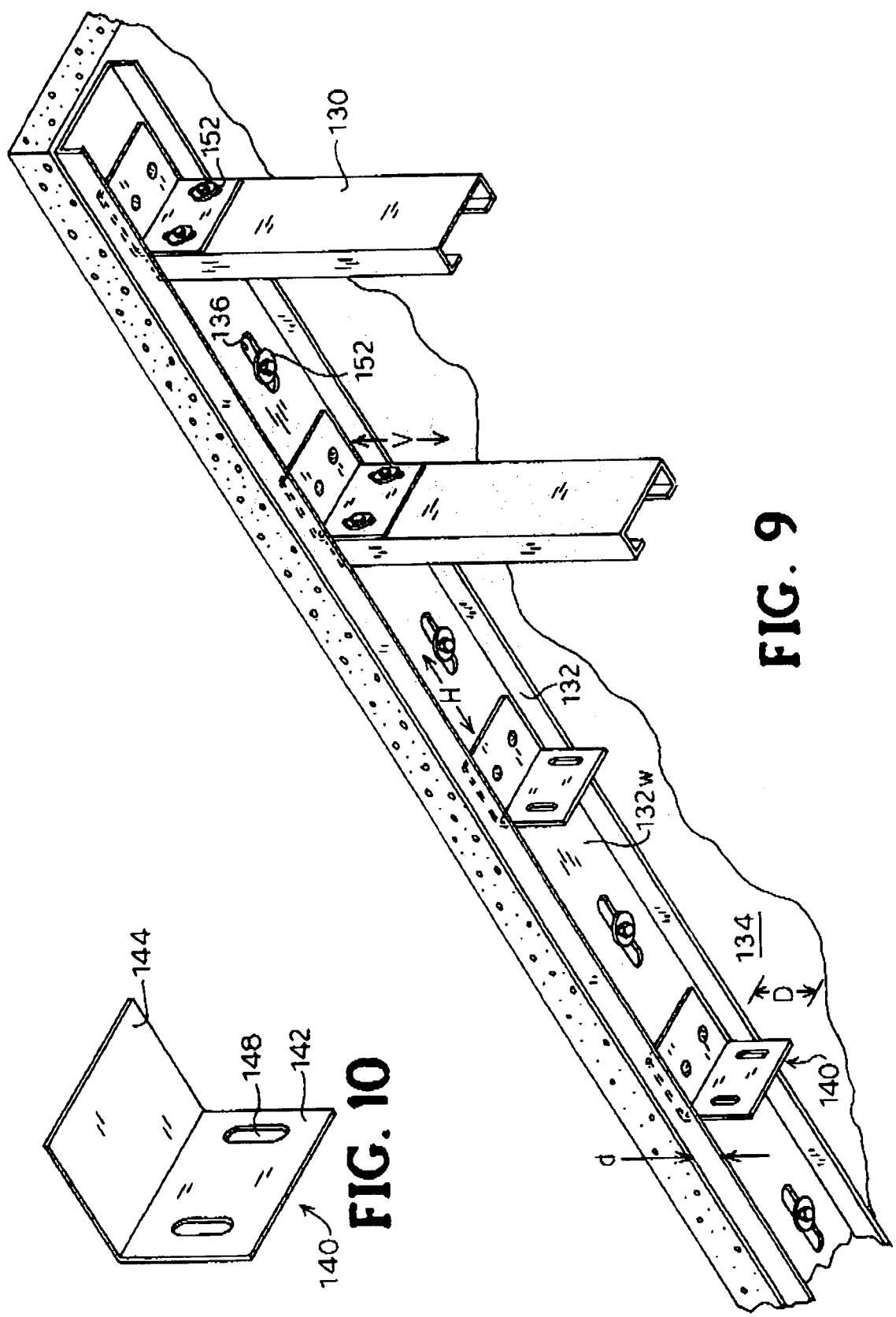

CONNECTOR FOR CONNECTING TWO BUILDING MEMBERS TOGETHER THAT PERMITS RELATIVE MOVEMENT BETWEEN THE BUILDING MEMBERS

FIELD OF THE INVENTION

The present invention relates to light steel framing and more particularly, to a connector for connecting two structural members together in a manner that will allow one of the members to move relative to the other member while still being connected via the connector.

BACKGROUND OF THE INVENTION

Seismic activity plagues buildings and their inhabitants in many areas of the world, causing untold amounts of damage and monetary loss in addition to injury and loss of life. Building damage is mainly due to the vibration of a building which causes shifts of one portion of the building frame with respect to another portion. In conventional construction, the building components are rigidly locked together and their connective joints will fracture under the vibrational stress, often resulting in collapse.

U.S. Pat. No. 5,467,566 for a Curtain Wall Clip; U.S. Pat. No. 5,876,006 for a Stud Mounting Clip; and U.S. Pat. No. 5,906,080 for a Bracket For Interconnecting A Building Stud To Primary Structural Components each provide connective building components which permit relative movement between structural members in a vertical direction. The teachings of each of these patents are incorporated by reference. These patents all recognize an important need to permit building frame members to shift rather than fracture. However, none of these patents provides for movement in a horizontal plane, although this movement does occur during an earthquake. Thus, while the building floor is free to move relative to its walls for a limited vertical distance when the known connectors are used, horizontal movement is not an option. When the seismic vibration occurs in a direction to induce horizontal shift, damage, injury, and death can still happen.

SUMMARY OF THE INVENTION

The present invention entails a connector for connecting building components in a manner that permits bi-directional relative movement between the building components. In one embodiment, the connector includes first and second plates disposed at an angle with respect to each other. Each plate includes a pair of flanges disposed on opposite sides thereof. At least one elongated slot is formed in each plate and wherein the slot in one plate is oriented at an angle with respect to the slot in the other plate. Finally, a pair of spaced-apart reinforcing straps extend between the first and second plates.

In one particular embodiment, the reinforcing straps are secured between corresponding pairs of flange formed about the plates of the connector. In this embodiment, the plates are further secured together by fasteners wherein each fastener connects one flange of one plate with one flange of the other plate.

In another embodiment, the present invention entails a connector for interconnecting two building members wherein the connector includes a track and a slideable connecting member confined within the track. In this case, the connecting member includes a portion that projects from the track and functions to attach to one of the building members via one or more fasteners that extend through one or more slots in the portion. The track, on the other hand, connects to the other building member. Consequently, the connecting member can move within the track in response to one of the building members moving relative to the other building member. Further, because of the one or more slots in the portion of the connecting member extending from the track, there can be relative movement between the other building member and the portion of the connecting member extending from the track.

Other objects and advantages of the present invention will become apparent and obvious from a study of the following description and the accompanying drawings which are merely illustrative of such invention.

BRIEF DESCRIPTION OF THE DRAWINGS

In order for the invention to become more clearly understood it will be disclosed in greater detail with reference to the accompanying drawings, in which:

FIG. 9 is a perspective view of another embodiment of the invention in which a plurality of unidirectional brackets are assembled to a track that is free to move in a direction perpendicular thereto.

FIG. 10 is a perspective view of a unidirectional bracket of FIG. 9 prior to assembly thereto.

DESCRIPTION OF THE EXEMPLARY EMBODIMENTS

Figure 1:
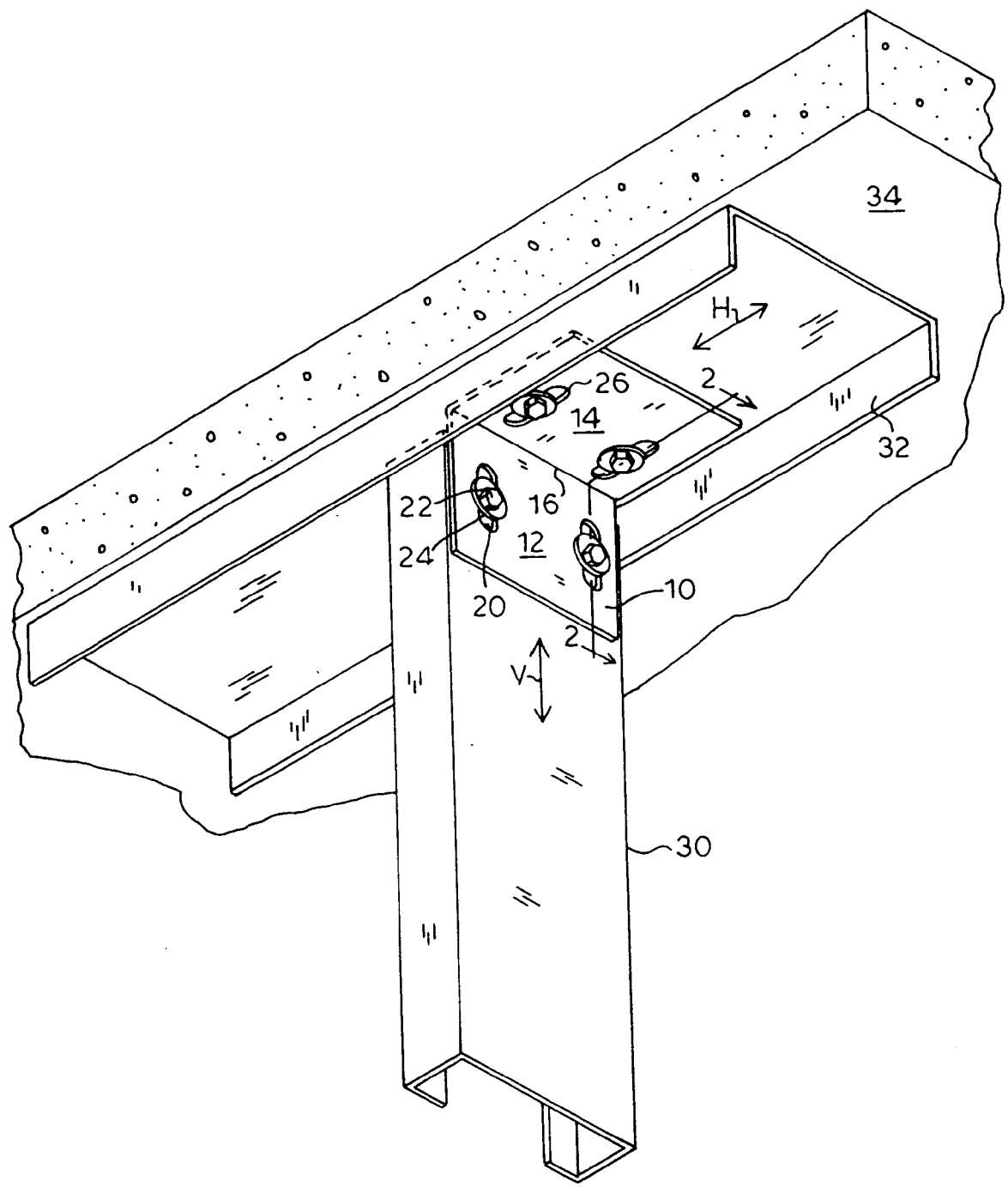
FIG. 1 is a perspective view of a first embodiment of the invention connector installed to connect between a vertical wall stud and a horizontal wall-top track so as to allow bi-directional deflection between the structural components illustrated.

FIG. 1 shows a first embodiment of the invention connector 10 as it is mounted to slidingly connect vertical member 30 to intersecting horizontal member 32. Vertical member 30 is, for example, a metallic wall stud, and horizontal member 32 is, for example, a metallic ceiling track. Connector 10 is formed from a planar metallic sheet that has been bent to form vertical plate 12 and horizontal plate 14 being connected to each other in substantially perpendicular relation at juncture 16. Connector 10 is preferably formed of galvanized sheet steel by punching and bending operations, as are known.

Vertical plate 12 is formed with a pair of vertical slots 20. Horizontal plate 14 is formed with a pair of parallel horizontal slots 26. Variations, such as forming one or both of vertical plate 12 and horizontal plate 14 with stiffening ribs or flanges, or punching a differing number of slots in each plate, are possible within the scope of the present invention.

Each of vertical plate 12 and horizontal plate 14 is slidingly connected to respective vertical member 30 and horizontal member 32 by means of fasteners 22 and stepped washers 24. Stepped washers 24, as described in prior patents '080 and '566 noted above, are positioned into respective slots 20 and 26 and fasteners 22 are installed therethrough. Stepped washers 24 are sized to allow relative sliding motion between vertical member 30 and horizontal member 32 both in vertical direction V and in horizontal direction H. As illustrated, fasteners 22 are preferably installed near the midpoints of slots 20 and 26 to allow for sliding vertical freedom toward each end of the respective slots.

A horizontally disposed member 34 is mounted on a series of supports, of which horizontal track member 32 is an example. If the building structure illustrated is to have additional floors, member 34 is considered a floor member. Alternatively, member 34 represents a roof member.

As will be understood by those skilled in the trade, each plate could be formed 10 with only a single slot, providing the slot were sufficiently long to permit at least two fasteners so as to maintain linear sliding motion.

Figure 2:
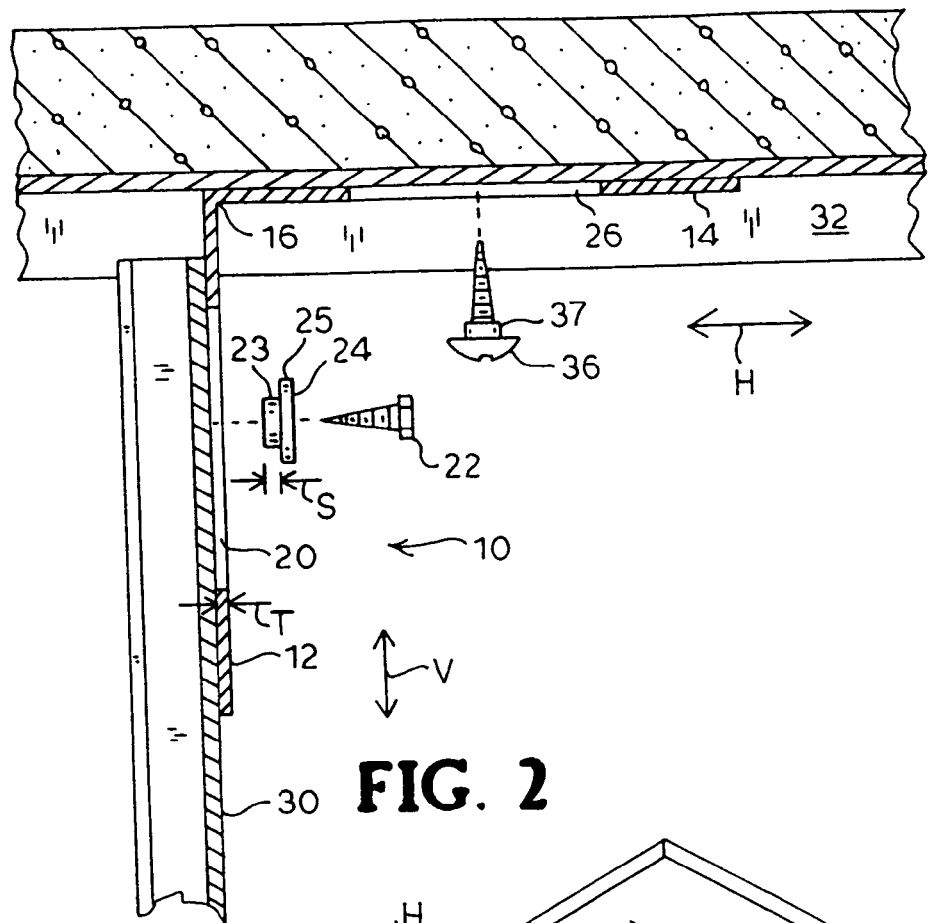
FIG. 2 is an enlarged cross sectional view through the connector of FIG. 1 taken in the direction of line 2—2 of FIG. 1 with fasteners shown in position prior to their installation.

Referring now to FIG. 2, a cross sectional view of connector 10 is illustrated as taken in the direction of line 2—2 of FIG. 1. This section is taken along a line through vertical slot 20 and horizontal slot 26 for clarity. Connector 10 is shown with its vertical plate 12 being in contact with vertical stud 30 and with its horizontal plate 14 in contact with horizontal track 32.

As will be understood by those skilled in the art, in order for relative deflection to take place, fasteners securing connector 10 to building members 30 and 32 must not make binding contact with connector 10. In one such embodiment, screw 22 is passed through stepped washer 24 to firmly engage stud 30 as described above. Stepped washer 24 has shank 23 that is smaller in diameter than the width of slot 20 and greater in height S than the thickness T of connector 10. Flange 25 of stepped washer 24 is made of any convenient size that will not enter slot 20. When fastener 22, in this case a sheet metal screw, is inserted through stepped washer 24 and shank 23 thereof is positioned in slot 20, stud 30 is able to move vertically relative to connector 10 and track 32 in the direction of arrow V.

An alternate means of fastening connector 10 is illustrated in relation to track 32. Shoulder screw 36 essentially incorporates a sheet metal screw and a stepped washer in a single unit. Shoulder screw 36 has shoulder portion 37 that is sized and shaped similarly to shank 23 of stepped washer 24. When shoulder screw 36 is installed through slot 26, shoulder portion 37 resides slidingly within slot 26 so that track 32 can move horizontally relative to connector 10 and stud 30 in the direction of arrow H.

Installation of connector 10 with a separate screw 22 and stepped washer 24 or as a single unit shoulder screw 36 can be alternatively implemented employing a rivet, a straight threaded machine screw, or other fastening means, all being within the scope of the invention.

Figure 3:
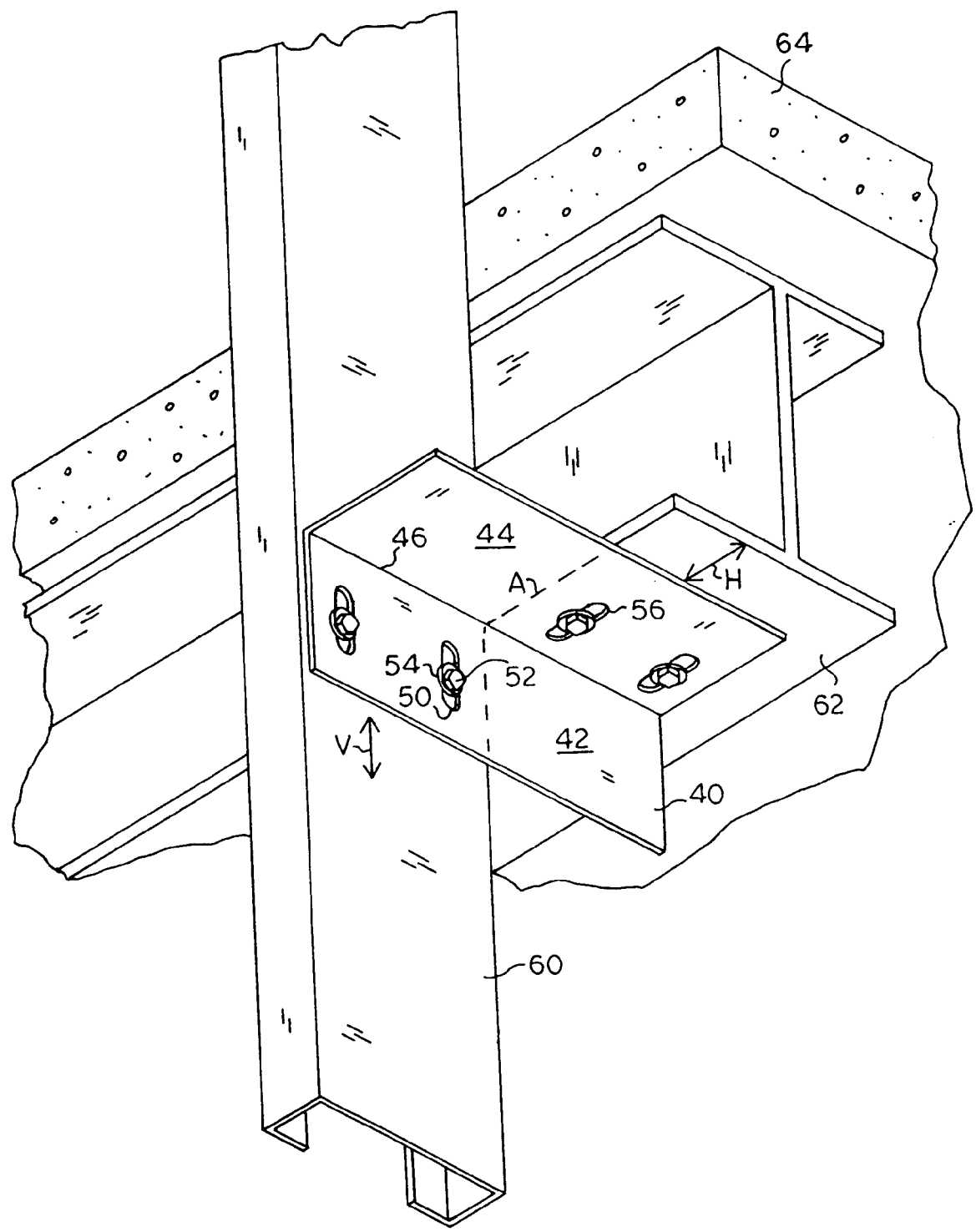
FIG. 3 is a perspective view of a second embodiment of the invention connector in which vertical mounting slots and horizontal mounting slots are offset from one another.

Referring now to FIG. 3, showing a further embodiment of the invention that pertains to situations in which the vertical and horizontal building members do not intersect. Connector 40 is attached to vertical member 60, such as a stud, and to horizontal member 62, such as a girder. Connector 40 comprises vertical plate 42 that connects to horizontal plate 44 at juncture 46. For purposes of explanation, a line A is shown as the approximate center of connector 40. Vertical slots 50, formed through vertical plate 42 are positioned on a first side of line A and horizontal slots 56 are positioned on a second side of line A. In this arrangement, slots 50 and slots 56 are each positioned adjacent a respective building members 60, 62. Fasteners 52 are installed through each slot 50, 56 of connector 40 with a stepped washer as described above. Alternatively, a shoulder fastener, also described above, may be used. Vertical member 60 is able to move vertically relative to horizontal member 62 in the direction of arrow V, and horizontal member 62 is able to move horizontally relative to vertical member 60 in the direction of arrow H.

Figure 4:
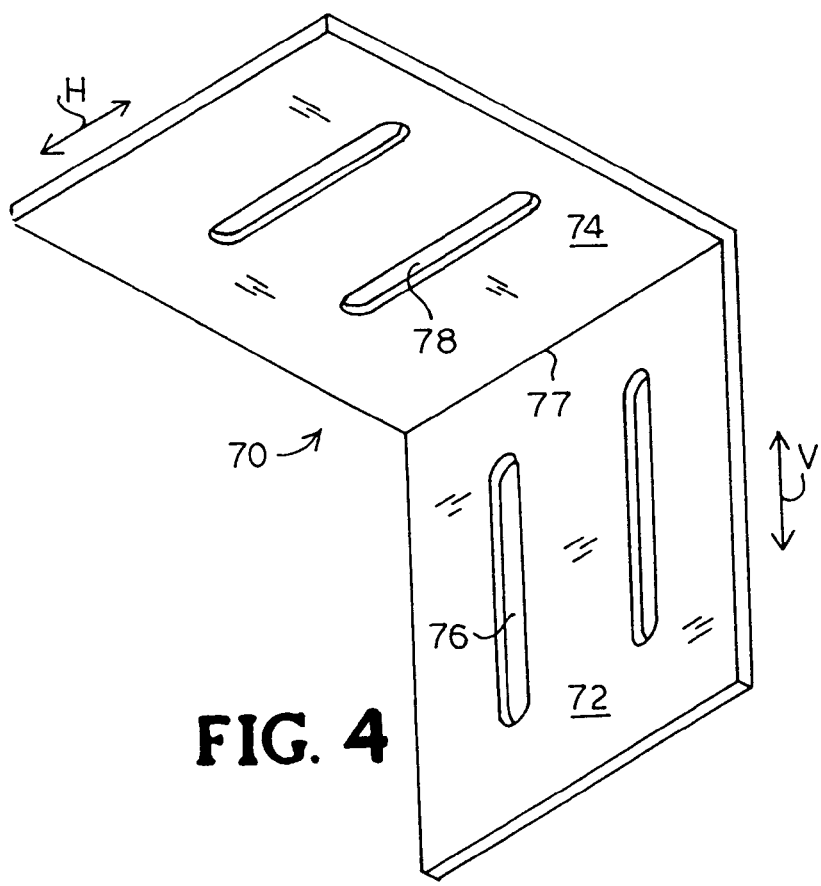
FIG. 4 is a perspective view of a third embodiment of the invention connector in which vertical mounting slots and horizontal mounting slots are differently oriented.
Figure 8:
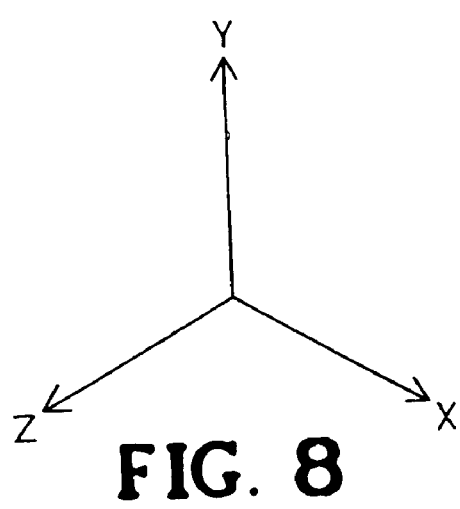
FIG. 8 is a schematic diagram illustrating three mutually orthogonal axes.

FIG. 4 depicts a further embodiment of the invention. Connector 70 comprises vertical plate 72, having vertical slots 76 and horizontal plate 74, having horizontal slots 78. Whereas both sets of slots of the embodiments shown in FIGS. 1–3 were oriented substantially perpendicular to the juncture between the vertical and horizontal plates of the respective connector, in the embodiment of FIG. 4, horizontal slots 78 are oriented parallel to junction 77. By this variation, the relative motion between attached vertical and horizontal building components, as described in terms of a conventional three-dimensional orthogonal coordinate system X-Y-Z (seen in FIG. 8), can be oriented in an X-Y relation in one case or in a Y-Z relation in another.

Figure 5:
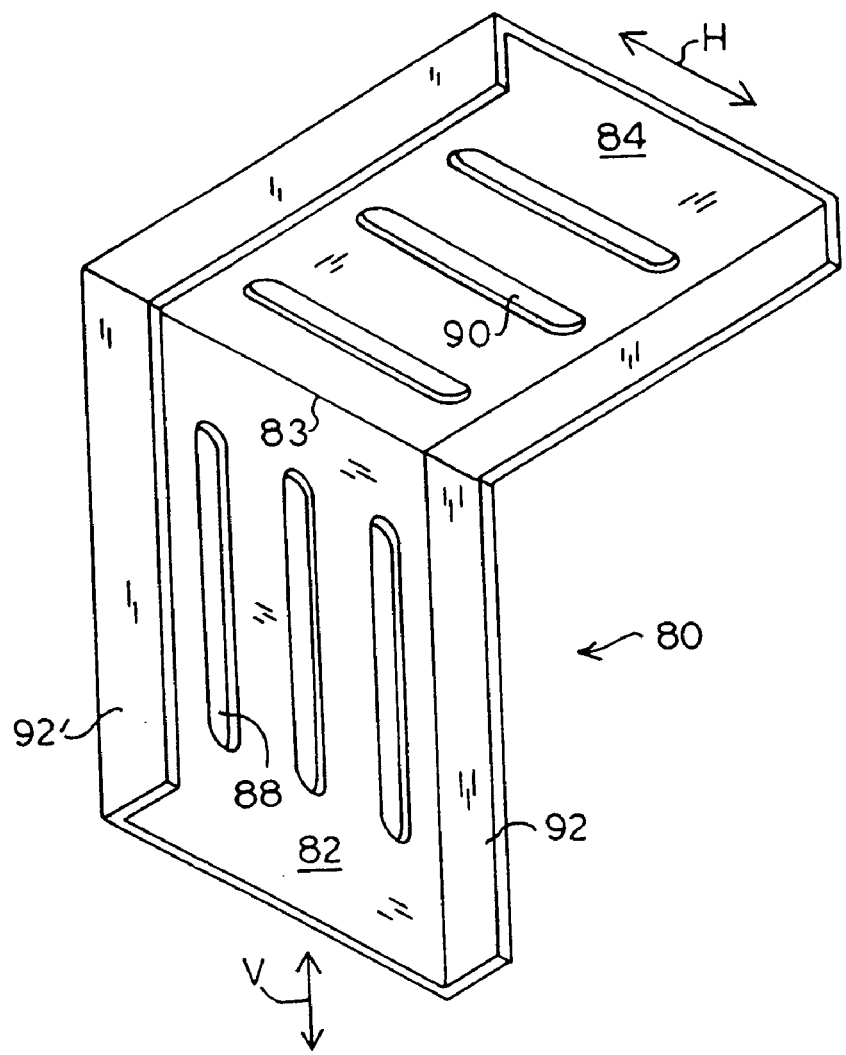
FIG. 5 is a perspective view of a fourth embodiment of the invention connector employing three parallel slots on each connector plate.

Referring now to FIG. 5, connector 80 provides additional modifications of the basic principle of the invention. Connector 80 has vertical plate 82 attached in perpendicular relation at juncture 83 to horizontal plate 84, and flanges 92 and 92' extending perpendicularly from the lateral edges of the respective plates 82 and 84. Vertical plate 82 is formed with, for example, three vertical slots 88 therethrough. Horizontal plate 84 is formed with, for example, three horizontal slots 90 that are oriented substantially parallel to juncture 83. As will be apparent to those skilled in the art, the decision of how many parallel slots are to be formed in each plate is somewhat arbitrary, as evidenced by the examples shown herein containing two slots in one case and three slots in another. Thus, the number of slots shown is an example of selected embodiments of the invention and not a limitation of its scope.

Figure 6:
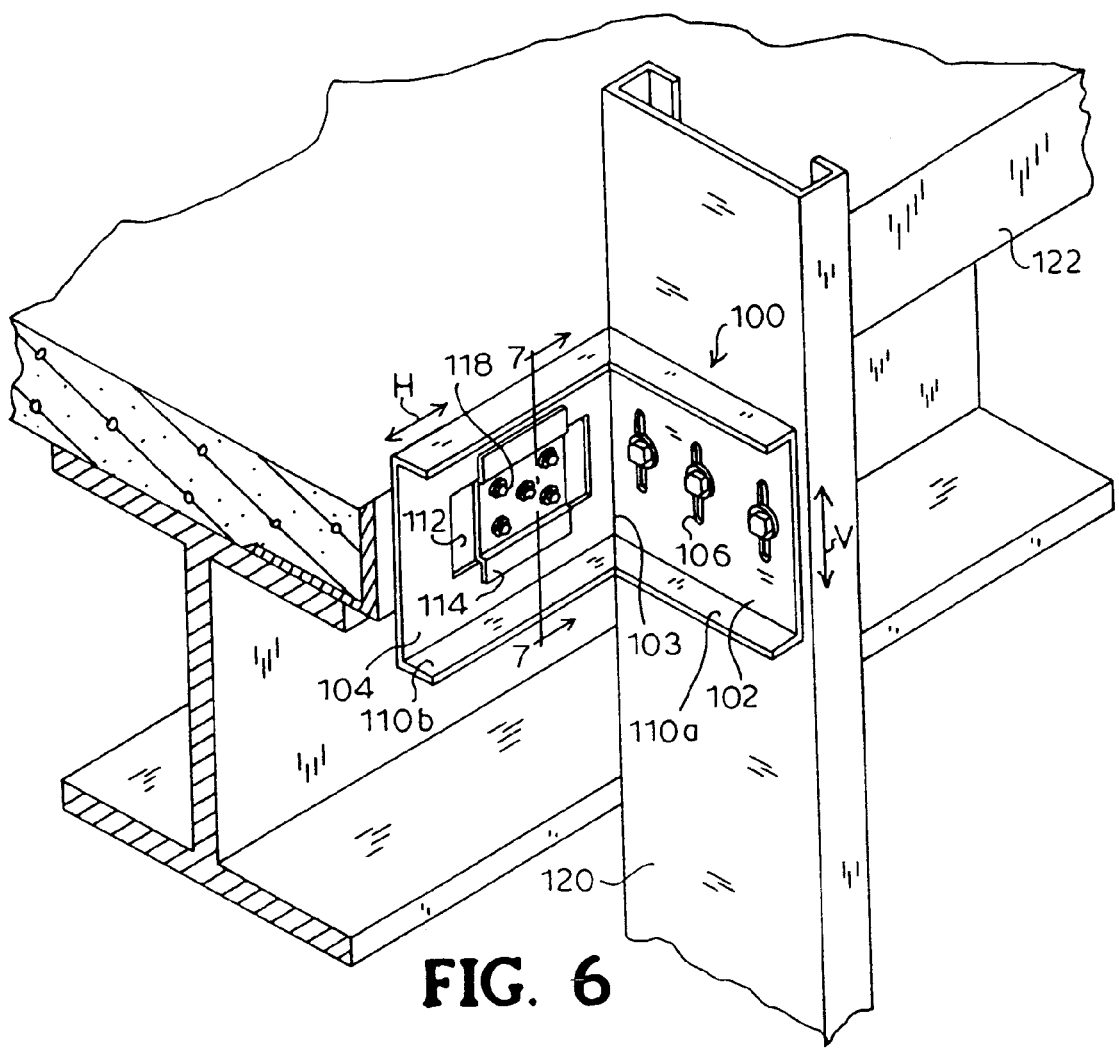
FIG. 6 is a perspective view of a fifth embodiment of the invention connector employing a rectangular stepped mounting plate on one connector plate and three slots on the other connector plate.
Figure 7:
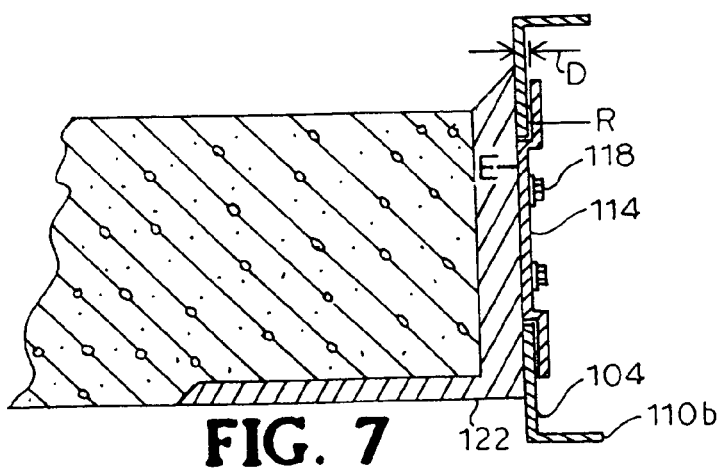
FIG. 7 is an enlarged cross sectional view through the connector of FIG. 6 taken in the direction of line 7—7 of FIG. 6.

A further embodiment of the invention is illustrated in FIGS. 6 and 7. FIG. 6 shows connector 100, having first vertical plate 102 attached perpendicularly at juncture 103 to second vertical plate 104. Connector 100 is adapted for installation in situations where vertical member 120, e.g., a stud, is being attached slideably to horizontal member 122, e.g., an angle beam, and the building members do not intersect. However, the connector shown in this embodiment could be utilized to slidably attach intersecting structural members as shown in FIG. 1. Vertical plate 102 is formed with three vertical slots 106 that are substantially parallel to juncture 103, each slot 106 having a fastener and stepped washer installed therethrough as described above. Vertical plate 104 is formed with an elongate slot in the form of a rectangular window 112. Window 112 is oriented with its long dimension horizontal. A guide 114, best seen in FIG. 7, is bent so as to have an engaging surface E adapted for engaging angle beam 122 and a retaining surface R parallel to and offset from engaging surface E, and adapted for containing vertical plate 104 in sliding engagement with angle beam 122. The offset distance D (see FIG. 7) between surfaces E and R of guide 114 is slightly greater than the thickness of the metal from which vertical plate 104 is made. FIG. 7 provides a cross section of guide 114 to show the required depth of offset between the engaging and retaining the two levels of guide 114. The engaging surface of guide 114 is slightly narrower than the opening of window 112 to permit sliding. Thus this further embodiment provides an additional manner of achieving vertical deflection of a first building structural member in the direction of arrow V and horizontal deflection of a second building structural member in the direction of arrow H (FIG. 6).

Referring now to FIG. 9, a second embodiment of the invention is illustrated. This second embodiment provides a track 132 to which a plurality of brackets 140 have been assembled for connecting a plurality of studs 130 to a ceiling member 134 or a floor member (not shown). Track 132 is formed in a generally elongate channel shape with a series of linear slots 136 punched through web 132w thereof at selected intervals along track 132. Typical intervals from the center of a first slot 136 to the center of an adjacent slot 136 is either 16 inches or 24 inches to accommodate the typical spacing of studs in a building wall. Slots 136 are oriented substantially parallel to the length of track 132.

The second component of the second embodiment of the invention is bracket 140, formed of bent metal to have vertical plate 142 and horizontal plate 144, seen prior to assembly to track 132 in FIG. 10. Vertical plate 142 is preferably formed with a pair of parallel, vertically oriented slots 148 therethrough. Horizontal plate 144 is preferably formed without holes. One unidirectional bracket 140 is fixedly mounted to web 132w intermediate each pair of adjacent slots 136, for example by spot welding, so as to be similarly spaced apart from the next bracket 140. By welding brackets 140 to track 132, as opposed to assembly with screws or rivets, no fastener part protrudes above track 132.

With a plurality of brackets 140 welded or otherwise affixed to the inside of web 132w and a plurality of slots 136 formed through web 132w intermediate brackets 140, track 132 is slidingly assembled to ceiling member 134 by means of a fastener 152 passed through each slot 136. Fastener 152 preferably comprises a sheet metal screw with a spacer, as discussed in detail above. Track 132 will be moveable in the direction indicated by arrow H, but no other direction. With track 132 thus mounted, a series of vertically oriented studs 130 are slidingly assembled to bracket 140 by passing a similar fastener 152 through slots 148 in vertical plate 142. Studs 130 are preferably formed shorter by approximately the height d of track 132 as compared to the distance between ceiling track 132 and a floor track (not shown) to allow a degree of vertical freedom in case of seismic activity. Ceiling track 132 is slidingly mounted to ceiling member 134 to allow horizontal freedom.

Figure 11:
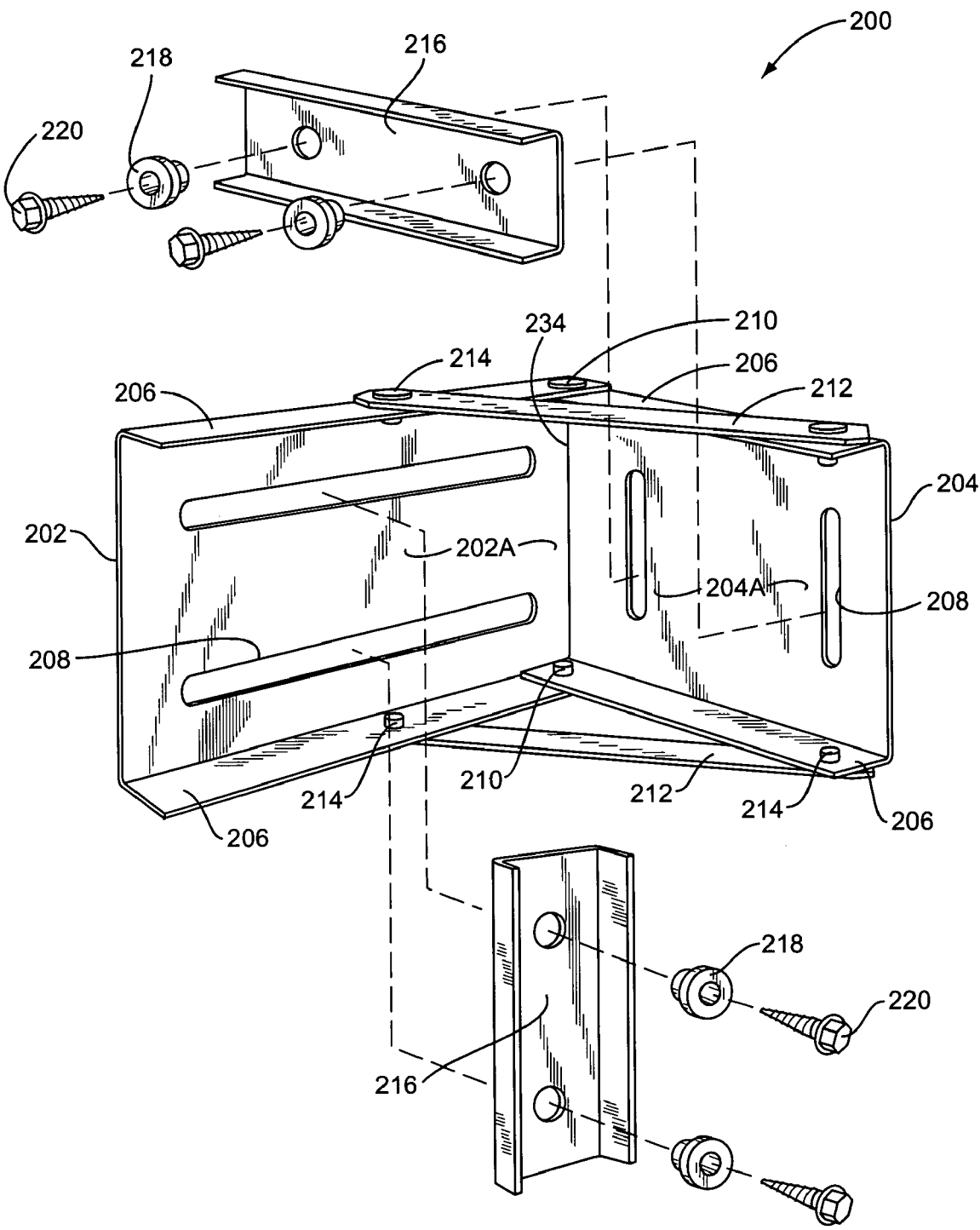
FIG. 11 is an exploded perspective view of another connector design.
Figure 12:
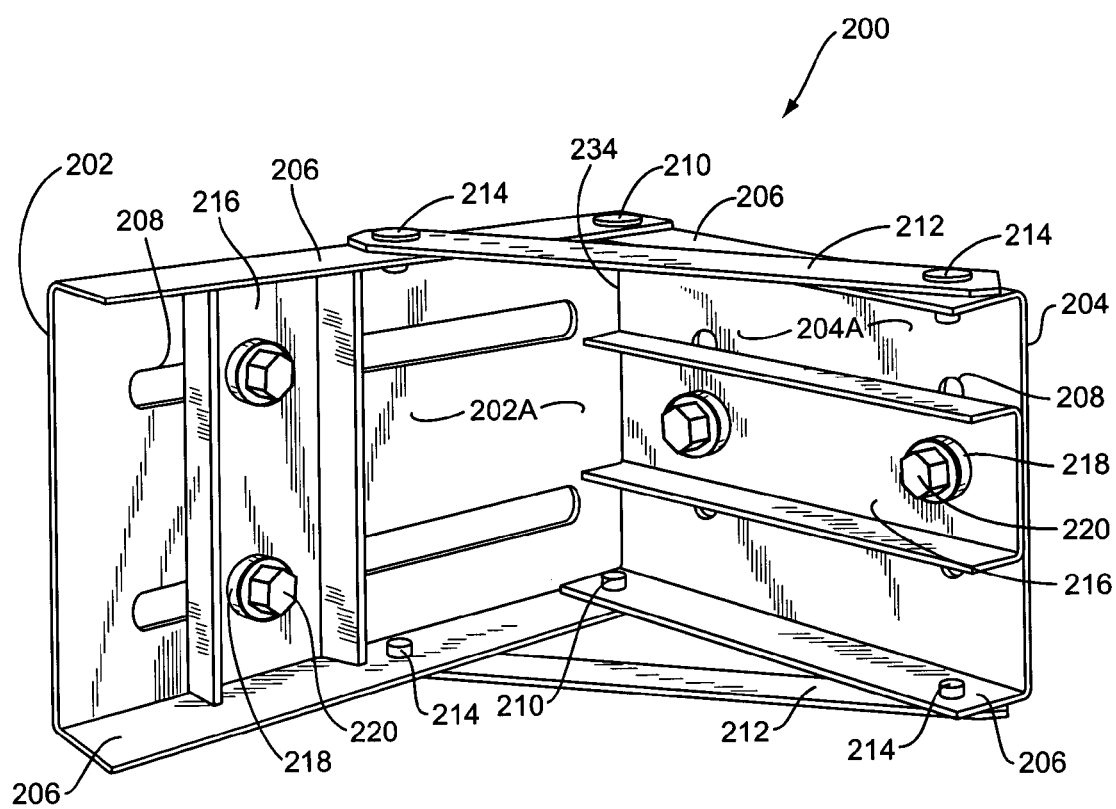
FIG. 12 is a perspective view of the design shown in FIG. 11.
Figure 13:
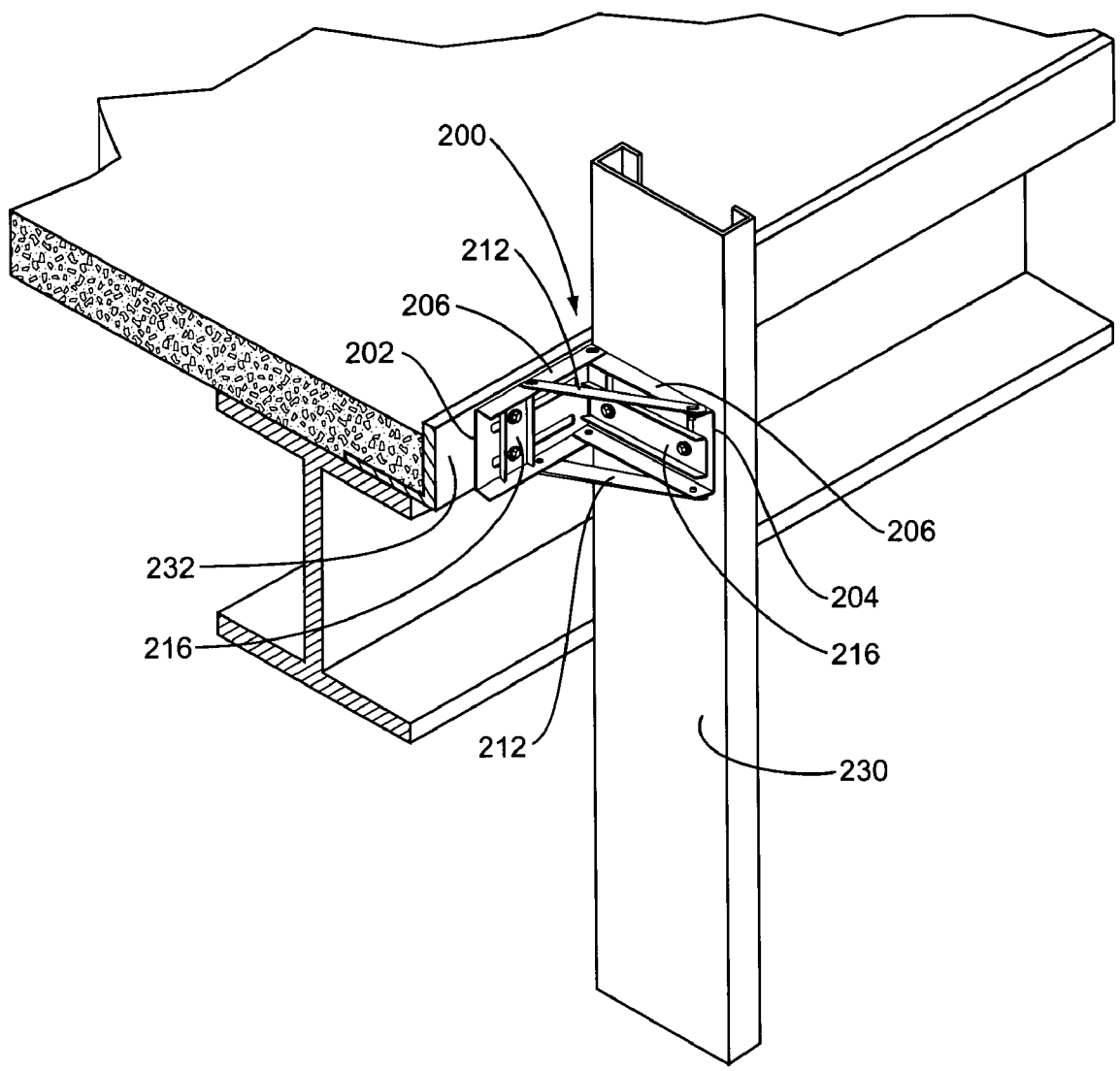
FIG. 13 is a fragmentary perspective view illustrating the connector of FIGS. 11 and 12 secured to two building members.

FIGS. 11 through 13 illustrate another embodiment of the present invention. Here a connector, indicated generally by the numeral 200, is shown and as particularly illustrated in FIG. 13 is adapted to be connected to two building members which in this case comprise a vertical member 230 (stud) and a horizontal member 232. As we will appreciated from the subsequent disclosure, connector 200 enables the two building members 230 and 232 to move relative to each other while still being connecting by the connector 200.

Viewing connector 200 in more detail and with particular reference to FIGS. 11 and 12, the connector 200 comprises a first plate 202 and a second plate 204. Each plate includes a central portion 202A or 204A. In the embodiment illustrated in FIG. 11, the plates 202 and 204 are integral or formed from one piece of material which in this case is metal. In particular, the single piece of material is shaped or bent to effectively form the two plates and the angle therebetween. A bend 234 is formed at the juncture of the plates 202 and 204. In one typical method of construction, the connector 200 initially begins as a single piece of material that includes opposed edges that are notched intermediately between the opposed ends of the piece of material. Thereafter the piece of material is bent to form the bend 234 and the outer edges are turned to form the flanges 206. Although in the embodiment illustrated herein the plates 202 and 204 are formed from a single piece of material, it should be appreciated that the two plates 202 and 204 could be fabricated from two or more pieces of material.

Strength and rigidity is imparted to the connector 200 by flanges 206. Each plate 202 and 204 includes a pair of opposed flanges 206. In this case, the flanges 206 are integral or formed form the same piece of material that forms the respective plates 202 and 204. Thus, each plate including the central portion 202A or 204A along with the flanges 206 form a generally U-shaped channel structure.

Formed in each plate 202 and 204 is a pair of elongated slots 208. Note that the slots in each plate are formed such that they extend in different directions. That is, as viewed in FIG. 11 for example, the slots 208 in plate 206 extend generally horizontal while the slots 208 in plate 204 extend generally vertically. A pair of fasteners 210 are extended through the end portions of the respective flanges 206, as illustrated in FIG. 11. Various types of fasteners may be used. In the embodiment illustrated herein, the fasteners 210 comprise a rivet-type fastener. As illustrated in FIG. 11, the plates 202 and 204 are disposed at an angle with respect to each other. In the particular embodiment illustrated herein, plates 202 and 204 form a generally 90° angle. Other angles may be formed between the plates. This facilitates the securement of the connector 200 to a horizontal building member and a vertical building member as illustrated in FIG. 13. Fasteners 210 are secured adjacent the juncture area or bend 234 of the two plates 202 and 204.

Extending diagonally across opposed portions of the connector 200 in a pair of reinforcing strip 212. Note in FIGS. 11 and 12 that each reinforcing strip 212 extends outwardly of a pair of flanges 206. In the case of the embodiment illustrated in FIGS. 11–13, each strap 212 extends from the end of plate 204 to an intermediate point on plate 202 with the reinforcing strap connected to the respective flanges 206 of these plates. A series of fasteners 214 are utilized to secure the straps 212 to the flanges 206. Various fasteners can be used. In the embodiment illustrated herein the fasteners 214 are of the rivet-type.

To provide additional strength and rigidity to the connector 200, a reinforcing member 216 can be utilized with each plate 202 and 204. In this case, the reinforcing member 216 assumes a generally U-shaped or channel-shaped metal bar and includes a pair of openings spaced to align where the slots 208 formed in either plate 202 or 204. Each reinforcing member 216 is designed to be secured to the outer face of the plates 202 and 204. Stepped washers 218 of the type discussed above and particularly shown in FIG. 2 can be utilized in securing the connector 200 to the stud 30 and horizontal building member 232, as shown in FIG. 13. The stepped washers 218 are inserted through the openings in the reinforcing members 216 such that a portion of the stepped washers extend into and through the respective slots 208. Thereafter, conventional metal fasteners screws 220 are inserted into the stepped washers 218 and into the respective building members 230 and 232.

As noted above, FIG. 13 illustrates the connector 200 secured to both a vertical building member which in this case is a stud 230 and a horizontal building member 232. Either building member 230 or 232 may move with respective to the other without breaking or fracturing the joint formed by the connector 200. In the case of relative movement, the reinforcing member 216 and the associated fasteners 220 can move back and forth relative to the adjacent plate 202 or 204.

Figure 14:
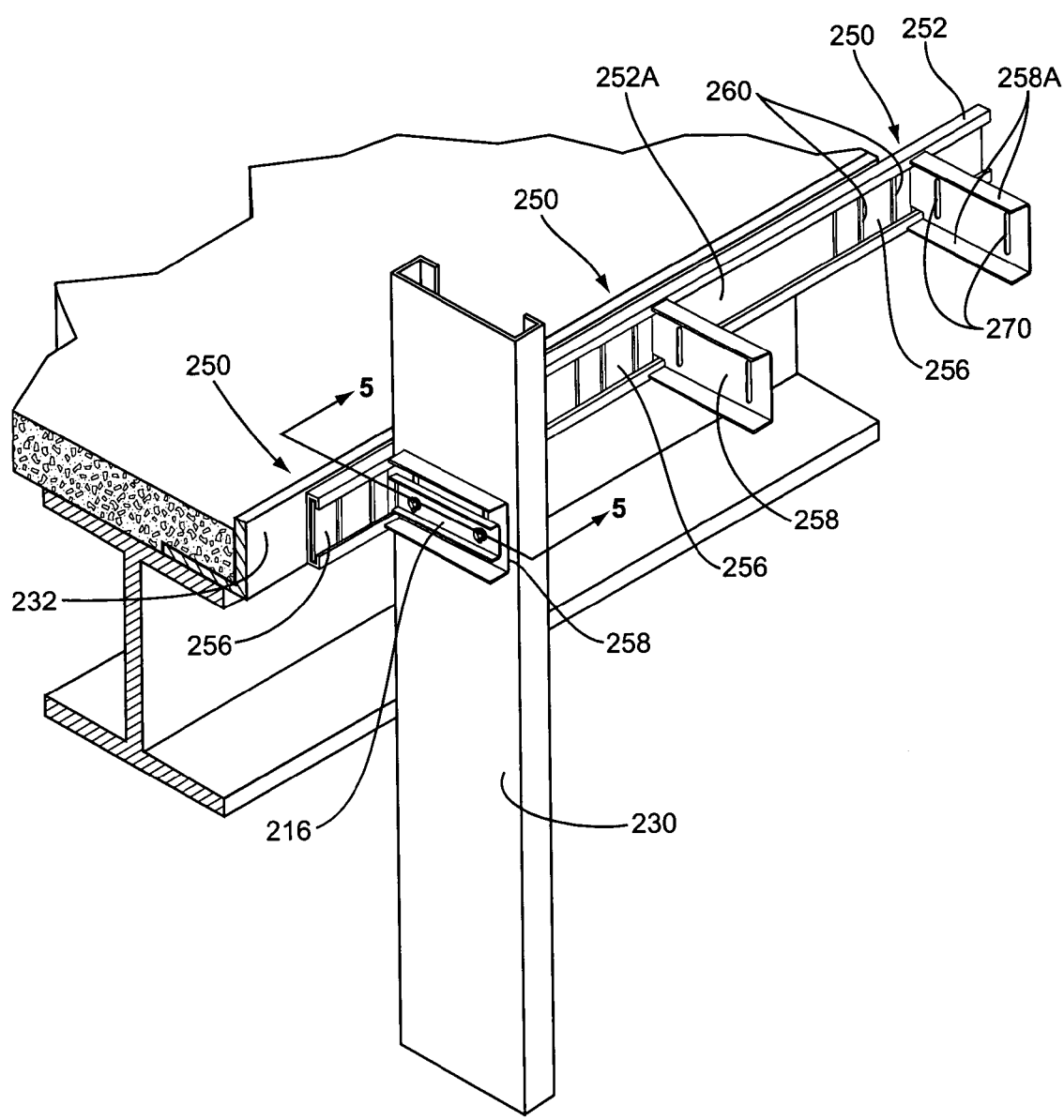
FIG. 14 is a perspective view of yet another connector design showing the connector connected to two building members.
Figure 15:
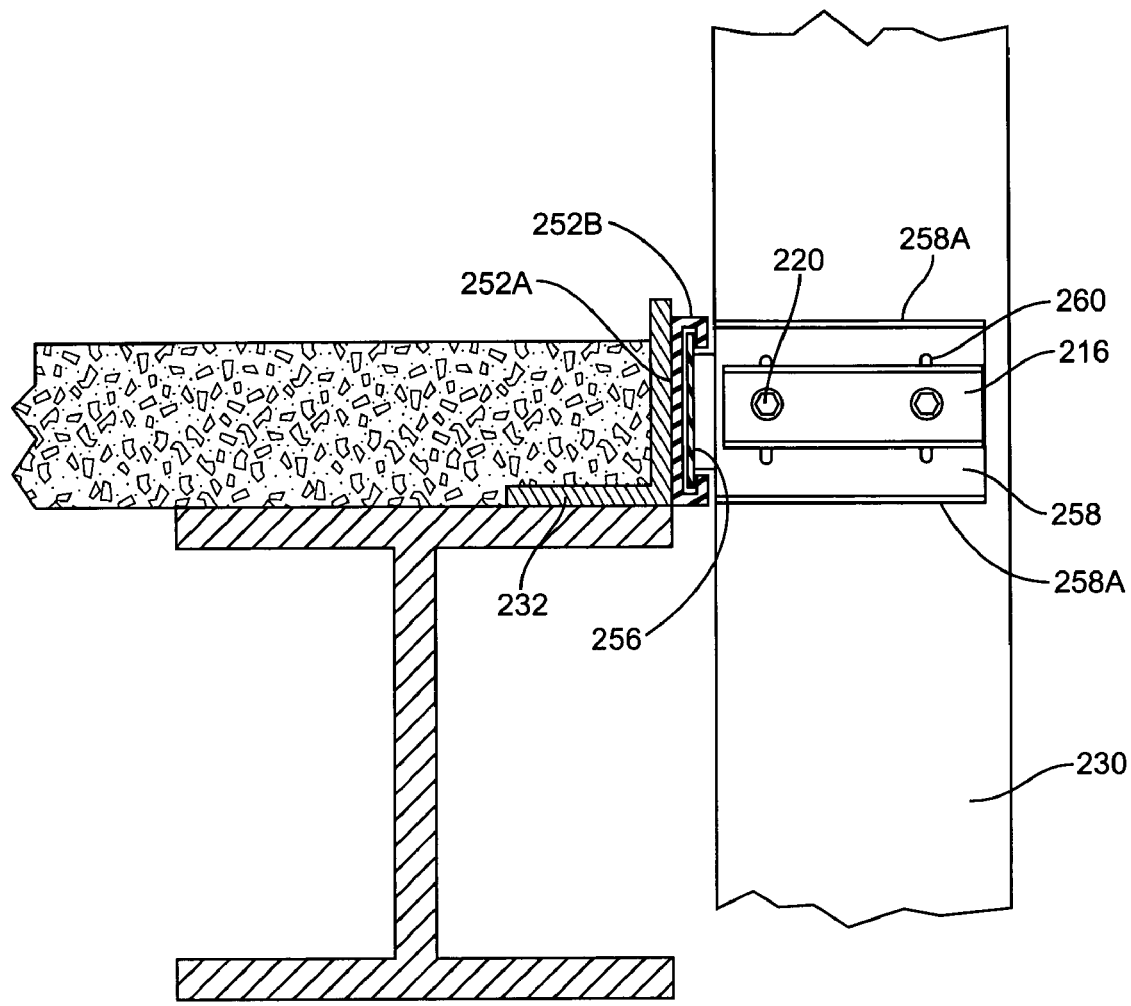
FIG. 15 is a cross-sectional view taken through the line 5—5 of FIG. 14.

Turning to FIGS. 14 and 15, another embodiment for a connector that permits bi-directional movement for building members is shown. In this case, the connector is indicated generally by the numeral 250. Connector 250 includes an elongated track 252. In this case, the elongated track 252 is generally of a C-shape and includes a back 252A and an edge 252B. Note in FIG. 15 where the edge 252B extends along one edge of the track 252 and curls over so as to define a track interiorly of the back 252A and the edge 252B. Track 252 is adapted to be fixably secured to a building member. In this case, track 252 is secured to horizontal building member 252.

Slideably mounted or contained within track 252 is a connecting member indicated generally by the numeral 254. Connecting member 254 in this embodiment includes a first portion 256 and a second portion 258. The first portion 256 is contained within the elongated track 252 and slidable back and forth therein. That is, as illustrated in FIG. 15, the first portion 256 of the connecting member 254 is disposed such that it lies adjacent the back 252A of the elongated track and the outer edges 252B of the track 252 curl around and confines the first portion 256 within the elongated track.

The second portion 258 of connecting member 254 extends outwardly from the track 252. This is illustrated in both FIGS. 14 and 15. That is, the second portion 258 is oriented at an angle with respect to the first portion of 256. In this case, the second portion is disposed generally at an angle of approximately 90° with respect to the first portion 256. As illustrated in the drawings, the first portion 256 is provided with a series of vertical ribs 260 that reinforce the same. The second portion 258 includes a pair of flanges 258A. The flanges 258A are turned to form a 90° angle with the central area of the second portion 258.

A series of slots 270 are formed in the second portion 258. Various means can be utilized to secure the second portion 258 to a building member such as the stud 230 shown in FIGS. 14 and 15. In the embodiment illustrated in FIGS. 14 and 15, the reinforcing member 216 discussed above with respect to the embodiment of FIGS. 11–13 is shown incorporated into this embodiment. However, it should be appreciate that the same type of securing arrangements discussed above with respect to the various embodiments disclosed herein can be utilized for securing the second portion 258 to the stud 230.

In this embodiment, the first and second portions 256 and 258 of the connecting member 254 are of an integral construction, that is, they are formed from a single piece of metal. An example of the construction of the connecting member 254 would entail cutting opposing slots from opposite edges of the connecting member 254 about the bend or juncture area. Thereafter, the connecting member 254 would be bent such that a selected angle is formed between the first and second portions 256 and 258. Thereafter, the flanges 258a would be formed by simply bending them to the position that they occupy in FIGS. 14 and 15. Of course, it is appreciated that other procedures can followed to form or fabricate the connecting member 254. That is, the connecting member 254 could comprise a multi-piece member.

As illustrated in FIG. 14, the elongated track 252 can accommodate a series of spaced-apart connecting members 254. The connecting member 254 would be spaced such that they can move back and forth within the elongated track 252. Consequently, it is appreciated that the entire connecting member 254 can move back and forth within the elongated track 252 in response to certain loads or forces being applied to the building structure. In addition, there can be relative movement between the second portion 258 of the connecting member 254 and the adjacent building member 230.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A connector for connecting first and second building members together and which permit the building members to move with respect to each other, the connector comprising:
   a. a track adapted to be connected to the first building member;
   b. the track being of a generally C-shape and including a back and a pair of opposed channels that extend in parallel relationship;
   c. a connecting member slidably contained in the track and movable back and forth therein;
   d. the connecting member having a first portion confined in the track and slidable back and forth therein, and a second portion extending at an angle with respect to the first portion and wherein the second portion of the connecting member extends outwardly from the track;
   e. one or more ribs formed in the first portion and extending transversely in relation to the track and generally perpendicular to the opposed channels of the track;
   f. the second portion of the connecting member including a generally flat main section and a pair of opposed flanges wherein the generally flat main section includes a front side and a back side with the back side being adapted to be disposed flush against the second building member when the connecting member is secured thereto;
   g. wherein the main section and flanges are integral and constructed from a single piece of material with the flanges being disposed generally perpendicular to the main section and projecting from the main section in a direction away from and generally opposite from the second building member when the connecting member is connected thereto;

h. at least one elongated slot formed in the main section of the second portion and oriented such that the elongated slot extends generally parallel to the one or more elongated ribs formed in the first portion of the connecting member; and
i. at least one fastener for extending through the elongated slot and connecting the second portion of the connecting member to the second building member;
a reinforcing member extending adjacent the main section of the second portion of the connecting member and between the opposed flanges, the reinforcing member being secured adjacent the main section of the second portion of the connecting member by the one or more fasteners that secure the second portion of the connecting member to the second building member, wherein the reinforcing member is generally U-shape and extends in parallel relationship to the opposed flanges of the main section of the second portion of the connecting member.

2. The connector of claim 1 wherein the track extends in a direction generally normal to the direction of the elongated slot in the second portion of the connecting member.

3. The connector of claim 1 wherein the flanges extend in a direction generally perpendicular to the direction of the one or more slots formed in the second portion of the connecting member.

* * * * *